United States Patent [19] [11] 4,054,636
Menig [45] Oct. 18, 1977

[54] METHOD OF MAKING A COMPOSITE CANDLE WITH POWDERED WAX CORE

[76] Inventor: John B. Menig, 283 Hart, Ben Lomond, Calif. 95005

[21] Appl. No.: 619,573

[22] Filed: Oct. 6, 1975

Related U.S. Application Data

[62] Division of Ser. No. 516,203, Oct. 21, 1974, abandoned.

[51] Int. Cl.[2] .......... B29C 3/00; B29C 5/00; B29C 6/00; B29F 5/00

[52] U.S. Cl. .......... 264/250; 264/255; 264/262; 264/268; 264/275; 264/279; 264/299; 264/330

[58] Field of Search .......... 264/259, 267, 269, 109, 264/112, 126, 128, 245, 246, 267, 250, 255, 271, 275, 279, 299, 301, 302, 269, 259, 251, 254, 261-263; 425/803, 117; 431/126, 288, 289

[56] References Cited

U.S. PATENT DOCUMENTS

| | | | |
|---|---|---|---|
| 1,863,416 | 6/1932 | Root | 431/288 |
| 1,896,123 | 2/1933 | Schweitzer | 264/302 |
| 2,635,294 | 4/1953 | Rolaston | 264/225 |
| 2,652,592 | 9/1953 | Williams | 264/245 |
| 3,002,221 | 10/1961 | Wright | 425/803 |
| 3,287,484 | 11/1966 | Justus | 431/288 |
| 3,385,649 | 5/1968 | Hicks | 431/126 |
| 3,702,495 | 11/1972 | Renoe | 264/319 |
| 3,773,881 | 11/1973 | Perera | 264/302 |
| 3,886,252 | 5/1975 | Eker et al. | 425/803 |
| 3,898,039 | 8/1975 | Lin | 431/288 |

OTHER PUBLICATIONS

Holde et al., The Examination of Hydrocarbon Oils . . . Fats and Waxes, Wiley, N.Y. (1927) pp. 513-515 relied on.

*Primary Examiner*—Willard E. Hoag
*Attorney, Agent, or Firm*—Flehr, Hohbach & Test

[57] ABSTRACT

Round, pillar or block type candles are fabricated by extending a wick centrally through a candle mold, initially forming a wax shell on the surface of the mold having one open end, filling the wax shell with powdered wax, and sealing the open end of the wax shell to contain the powdered wax therein. A candle is thus formed which may have a colored or scented exterior shell with a powdered wax interior and which will burn in a manner which facilitates the formation of "flowering sides" or "angel wings."

7 Claims, 11 Drawing Figures

METHOD OF MAKING A COMPOSITE CANDLE WITH POWDERED WAX CORE

This is a division of application Ser. No. 516,203, filed Oct. 21, 1974, now abandoned.

BACKGROUND OF THE INVENTION

This disclosure relates to a round, block or pillar type candle having a powdered wax interior, and more particularly to a method and apparatus for fabricating such a candle, providing candles which may be scented or colored, and which carry a quality appearance while displaying certain improved burning characteristics.

Top quality candles in the candle making industry are poured in metal or plastic molds and are then allowed to cool slowly. Some candle molds contain manifolds through which cooling liquid may be circulated to speed cooling to some degree, but generally the cooling process is slow to prevent voids in the wax which occur during fast cooling. Depending on candle size, the cooling takes from four to twelve hours, during which time other manual operations must be performed such as refilling with molten wax as the wax solidifies and shrinks in volume, and "poling" which involves opening a bubble which often forms near the top of the mold beneath the exterior surface of the wax. The candle mold is occupied during thie entire period of time.

Candles fabricated in water cooled molds require the use of a mold release and usually have a somewhat opaque look. Translucency is a characteristic associated with a quality candle and is obtained through a slow cooling process. Quality candle fabrication has therefore required much handling by a labor force, considerable time in the candle molds, consequent greater numbers of molds for acceptable production rates, and therefore greater space for production operations.

There is therefore a need for a wax candle having quality characteristics which may be formed in a relatively short period of time in an automated fashion, thereby freeing the labor force from many manual operations, freeing the equipment for recycle in shorter elapsed time, and requiring less production space for considerably higher production rate.

SUMMARY OF THE INVENTION AND OBJECTS

An apparatus and method is disclosed for fabricating a molded article of unique construction. The article is formed from material which is in a solid phase at one temperature and which is in a liquid phase at a higher temperature. A mold is provided for imparting a predetermined exterior shape to the article. Means are provided for pouring a predetermined volume of the material in the liquid phase into the mold. Means are provided for removing a portion of the material still in the liquid phase from the mold after a shell of the material has cooled to assume the solid phase at the surface of the mold. Subsequently a powder form of the material is placed within the shell by means for depositing a predetermined volume of powder equivalent to the removed volume of material in the liquid phase. Means are then provided for sealing the openings in the shell thereby retaining the material in powdered form within a solid external shell. A means is provided for imparting relative motion between the mold and the means for pouring, removing depositing and sealing so that the mold is positioned adjacent to each of the above named means in sequence for a period of time sufficient to perform the individual funtions.

A method for forming an article from a material having a lower temperature at which it exists in a solid phase and having a higher temperature at which it exists in a liquid phase is disclosed which includes pouring the material into a mold, allowing a shell of the material to form at the surface of the mold by cooling action, removing the remaining material from the mold yet in a liquid phase, depositing a volume of the material in powdered form equivalent to the liquid phase volume removed, and sealing the openings in the shell for retaining the powdered state material within the shell.

A molded article is formed having an exterior shell containing the quality attributes of a slowly cooled article, but having a powder interior sealed from the exterior of the shell.

In general it is an object of the present invention to provide a method and apparatus for the formation of round, pillar and block type candles which is automated.

Another object of the present invention is to provide a method and apparatus for forming round, block and pillar type candles which requires the minimum number of molds and a minimum amount of production space.

Another object of the present invention is to provide a method and apparatus for forming round, block and pillar type candles using substantially less dye for colored candles and substantially less scent for scented candles.

Another object of the present invention is to provide a method and apparatus for forming round, block and pillar type candles which are lighter in weight than conventional candles of similar size.

Another object of the present invention is to provide a method and apparatus for forming round, block and pillar type candles which have the translucent appearance and lack of surface bubbles associated with quality type candles using a process requiring considerably less time for fabrication.

These and other objects and features of the invention will be apparent from the following description when taken in conjunction with the accompanying drawings.

DETAILED DESCRIPTION OF THE PREFERRED EMBODIMENTS

Figure 1:
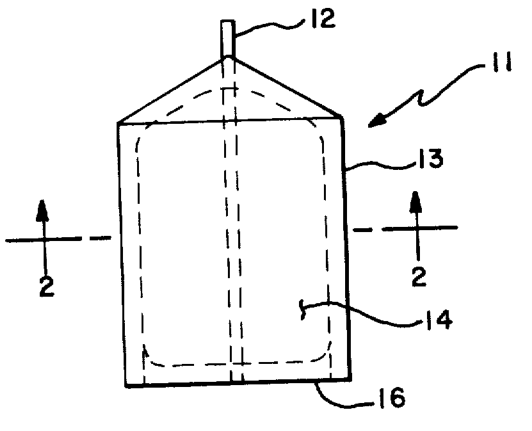
FIG. 1 is a side elevational view of a candle made by the disclosed process.

A molded article is disclosed having a solid exterior and a sealed-in powdered interior. Candles of the round, pillar or block type are found to paritcularly lend themselves to this mode of construction as may be seen by reference to FIG. 1. A round candle 11 of the type which is approximately three inches in diameter is seen having a wick 12 extending therethrough. An outer shell 13 of candle wax presents a smooth exterior somewhat translucent in appearance, and the wick 12 extends from one end of the outer shell for lighting. A powdered wax volume 14 fills the interior of the shell 13, and a seal 16, which may be solidified wax, seals the outer shell into a complete enclosure, thereby containing the powdered wax volume 14 therein.

Figure 2:
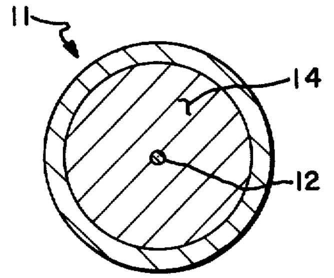
FIG. 2 is a sectional view taken along the line 2—2 of FIG. 1.

Referring to FIG. 2, wick 12 is shown centrally located in round candle 11, and powdered wax volume 14 is shown surrounding wick 12 as it extends through the body of candle 11. Outer shell 13 may be seen to be relatively thin compared to the radius of candle 11. Outer shell 13 may contain a dye for coloring the candle or it may contain a scent which is exuded by the shell to the air in the immediate area of the candle. Powdered wax volume 14 is generally colorless and odorless. Thus a colored or scented candle may be formed with considerably less scent or dye being used since only that portion of the candle in shell 13 need contain these additives.

As candle 11 burns, the flame will melt the powdered wax interior, and wick 12 will be held substantially centrally located throughout the burning of the candle. Moreover, the relatively thin outer shell 13 provides a built-in tendency for the candle to "flower" or to form "angel wings" as is so often desired in candles of this type. Candles such as that disclosed herein measure only 85 to 90% of the weight of a candle having solid wax throughout. Moreover, any wax which is spilled, overflows, or is otherwise not utilized to make the outer shells 13, may be powdered and placed in the powder batch without regard for whatever dye may have been used therein. Thus there is a potential 100% use of wax for making the disclosed candle. The total use of wax raw materials, coupled with material saving and shipping cost saving due to reduced weight in the completed candle, together with reduction of amounts of dye and scent essence in the outer shell 13, provide considerable advantages for the candle of FIGS. 1 and 2.

Figure 3:
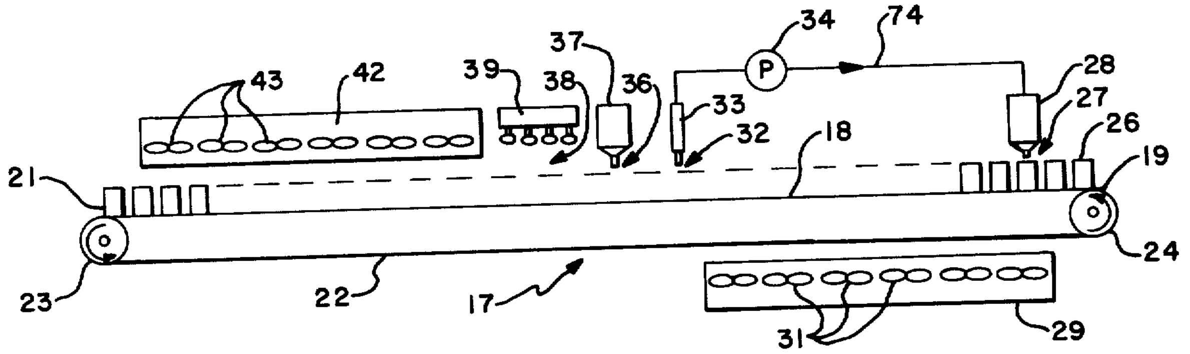
FIG. 3 is a mechanical shcematic of an apparatus used in the disclosed process.

Turning to FIG. 3, one embodiment of the apparatus for forming the candles of FIGS. 1 and 2 is shown. The apparatus of FIG. 3 includes a conveyor belt 17 having a forward upper segment 18 extending from a starting end 19 to an advanced end 21. A lower return segment 22 extends from advanced end 21 to starting end 19. Conveyor belt 17 is supported on a pair of rollers 23 and 24 which are rotated counter-clockwise as seen in FIG. 3 for advancing conveyor belt 17 from the starting end 19 to the advanced end 21.

A plurality of molds 26 are detachably affixed to conveyor belt 17. Molds 26 may be attached in lateral arrays of several molds as hereinafter described, and the arrays may then be spaced longitudinally along conveyor belt 17. A first station 27 overlies a point on conveyor belt 17 at which is located a means 28 for depositing a predetermined volume of molten wax into selected ones of molds 26. Means (not shown) are provided for advancing conveyor belt 17 as indicated by the arrows in FIG. 3 which also provide for predetermined dwell times at rest after a predetermined distance of advance has been covered by belt 17. Such driving means may be any of a number of well known types, such as a driving motor and a geneva drive.

Cooling means 29 may be provided for circulating air over the exterior surfaces of molds 26 for accelerating cooling of the wax layer adjacent to the surfaces of molds 26. Cooling means 29 is shown in FIG. 3 as comprising a series of fans 31 for causing cooling air to rise past the surfaces of molds 26.

A second station 32 overlies conveyor belt 17 at an advanced position from starting end 19 on the upper forward segement 18. Means 33 are provided at the second station 32 for withdrawing from mold 26 a predetermined portion of the molten wax deposited at the first station. A pump 34 may be connected to means 33 for withdrawing molten wax at station 32 and also for directing the withdrawn molten wax back to molten wax depositing means 28 for reuse.

A third station 36 overlying conveyor belt 17 in an advanced position from second station 32 is shown, at which is positioned a means 37 for depositing powdered wax into the molds 26. A fourth station 38 overlies conveyor belt 17 in a position advanced from third station 36. Means 39 are provided at fourth station 38 for sealing the openings in the articles carried in molds 26. As shown in FIG. 3 means 39 includes a plurality of heating elements 41 such as heating lamps. Means 39 for sealing may be a device for depositing a small portion of molten wax on top of the deposited powdered wax for sealing the powdered wax within the article. Alternate means 39 for sealing could include a device for attaching a base plate disc to the article in the molds 26 for retaining the deposited powdered wax therein.

Additional cooling means 42 are provided overlying conveyor belt 17 for cooling the seal to a solidified state in the event the seal is affected through the use of a small molten wax pour or through heating the exposed portion of the deposited powdered wax in the molds 26 above its melting point. Additional cooling means 42 may be similar to cooling means 29 inasmuch as it may contain a plurality of additional fans 43 similar to fans 31.

Figure 6:
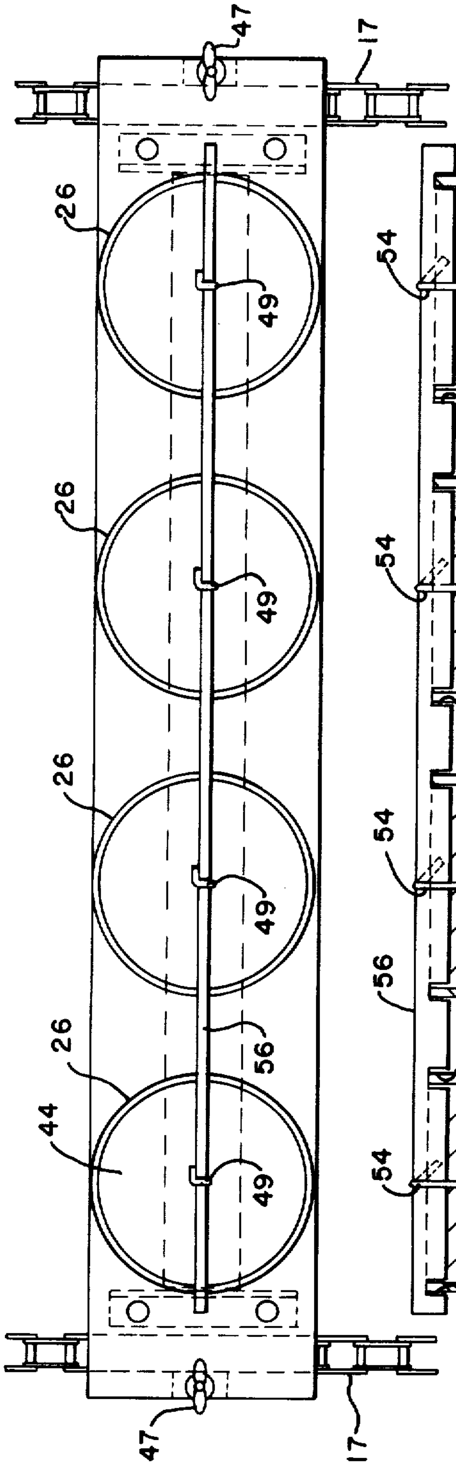
FIG. 6 is a plan view of a lateral array of molds.
Figure 7:
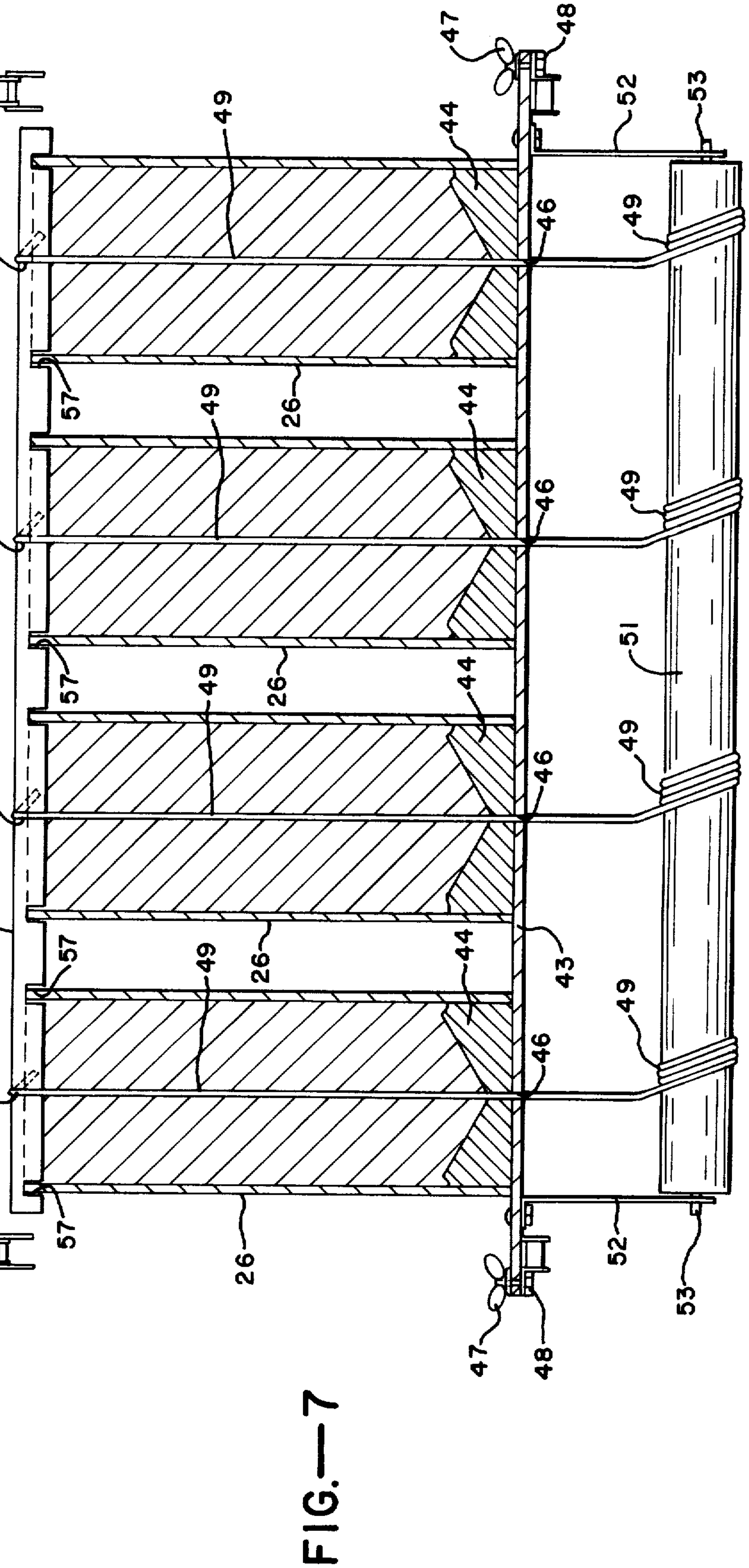
FIG. 7 is a front elevational view of a lateral array of molds.

Turning now to the operation of the apparatus described in FIG. 3, molds 26 are detachably affixed to conveyor belt 17 at starting end 19. Referring to FIGS. 6 and 7, one manner in which molds 26 may be arranged is shown in the lateral array of molds 26 pictured there. Conveyor belt 17 is shown as two spaced chains between which is supported a mold base plate 43. A plurality of mold sections 44 are spaced along the length of mold base plate 43 for forming the tops of molded articles such as candles 11. Mold sections 44 in this embodiment are attached to mold base plate 43 and a hole 46 extends through the center of mold sections 44 and mold base plate 43. Mold base plate 43 is detachably affixed to conveyor belt 17 by means such as wing bolts 47 extending through mold base plate 43 to engage spaced threaded members 48 carried on conveyor belt 17. Four molds are shown in the lateral array of molds in FIGS. 6 and 7 though more or fewer molds could be used.

Some means for holding wicking material 49 such as a dowel 51 may be suspended beneath conveyor belt 17 on brackets 52. Dowel 51 may rotate about a pin 53 on either end thereof engaging brackets 52. Wicking 49 is drawn up through hole 46 and molds 26 to be engaged in a slot 54 carried on a wick retaining bar 56. Wick retaining bar 56 has notches 57 therein for engaging the edges of molds 26 thereby positioning wicking 49 centrally through the molds 26.

Once the array of molds 26 described in FIGS. 6 and 7 have been attached to conveyor belt 17 by wing bolts 47, the belt 17 is advanced to first station 27 to underlie means 28 for depositing molten wax in the molds 26. The belt drive is configured to allow the array of molds 26 to remain in position underlying first station 27 for a predetermined dwell time. Means 28 for depositing molten wax in the array of molds 26 may be one of several configurations. One such configuration may be seen by reference to FIGS. 8 and 9. A reservoir 58 is provided for holding a supply of molten wax. A plurality of pouring devices 59 are provided in line positioned within reservoir 58. In general there are provided as many pouring devices 59 as there are molds 26 in a lateral array of molds. Pouring devices 59 have a spout 61 on a front side and a filling hole 62 on a back side. Pouring devices 59 are configured to pivot about a pin 63 attached to reservoir 58. A baffle 64 is provided within reservoir 58 for maintaining the level of the molten wax in the compartment where pouring devices 59 are located at a level which is even with the fill hole 62 in pouring device 59. Excess molten wax flows over baffle 64 to assume a lower variable level within the compartment indicated at 66 in FIG. 9 within reservoir 58.

A motor 67 has attached thereto a line 68 guided by a pulley 69 mounted on a bracket 71 attached to reservoir 58. Line 68 extends into reservoir 58 and is attached to a member 70 in turn attached to the lower back sides of pouring devices 59. A plurality of funnels 72 are attached by means of a bracket 73 to the side of reservoir 58 beneath spouts 61.

When a reservoir 58 is filled with molten wax and maintained at the level of fill hole 62 by baffle 64, the pouring devices 59 are filled to the level of hole 62. Upon the arrival of a lateral array of molds 26 at the first station 27 on conveyor belt 17 a switch (not shown) actuates motor 67 in a counter-clockwise direction as shown to draw line 68 around pulley 69 thus lifting. the lower corner at member 70 on the back side of pouring devices 59 A predetermined volume of molten wax is thereby poured from spouts 61 into each of the plurality of funnels 72 which direct the molten wax into the plurality of molds 26 in the lateral array of molds. At the end of the predetermined dwell time, motor 67 is rotated in a clockwise direction allowing pouring devices 59 to once again assume the fill position within reservoir 58.

As conveyor belt 17 is advanced after the predetermined dwell time at the first station the lateral array of molds just filled with molten wax is advanced into the area where cooling air is directed by cooling means 29 over the exterior surfaces of the molds 26 for cooling the wax adjacent to the mold surfaces to a solid state. As each lateral array of molds is advanced along conveyor belt 17 an unfilled array of molds is positioned at the first station for receiving the predertermined volume of molten wax.

Figure 8:
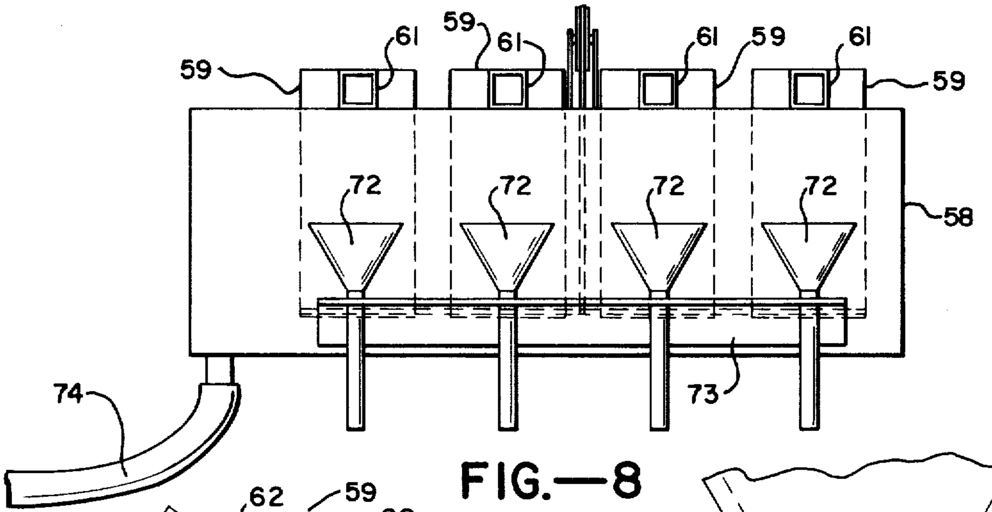
FIG. 8 is a front elevational view of one means for filling the lateral array of molds.
Figure 9:
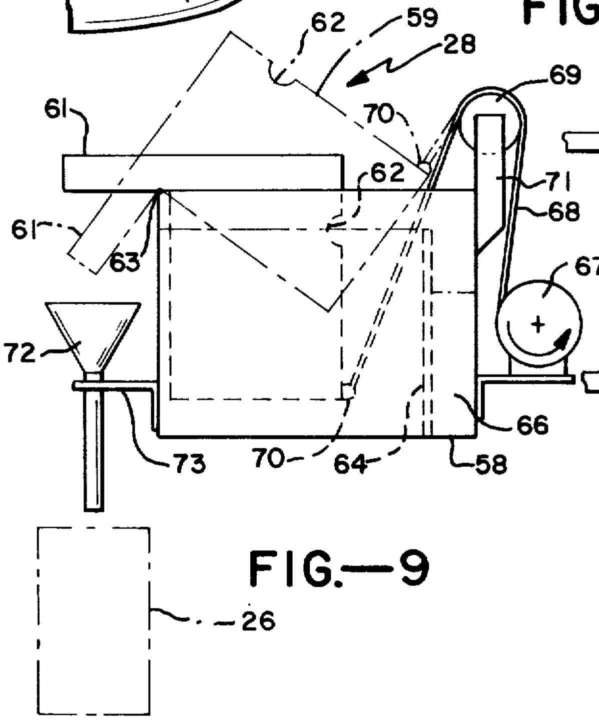
FIG. 9 is an end elevational view of the means of FIG. 8.

Each lateral array of molds eventually is positioned underlying second station 32 at which time a solid shell is formed adjacent to the inside surface of the molds by natural cooling and by cooling means 29 containing fans 31. Means 33 for withdrawing the central portion of molten wax within molds 26 at the second station 32 may consist of a telescoping tube which is lowered centrally into the molds 26 as actuated by a switch (not shown) which senses the arrival of the lateral array of molds at the second station 32. Pump 34 may then induce a vacuum into the telescoping tube for drawing the wax in the mold 26 which is still in the liquid phase up out of the molds and for directing it through a line 74 as seen in FIGS. 3 and 8 into the portion of reservoir 58 containing pouring devices 59. After being positioned at second station 32 for the predetermined dwell time such that liquid wax is removed from molds 26 leaving a solid wax shell therein, driving means advances conveyor belt 17 to third station 36 where means 37 deposits a predetermined volume of powdered wax into the shell contained in molds 26.

Figure 10:
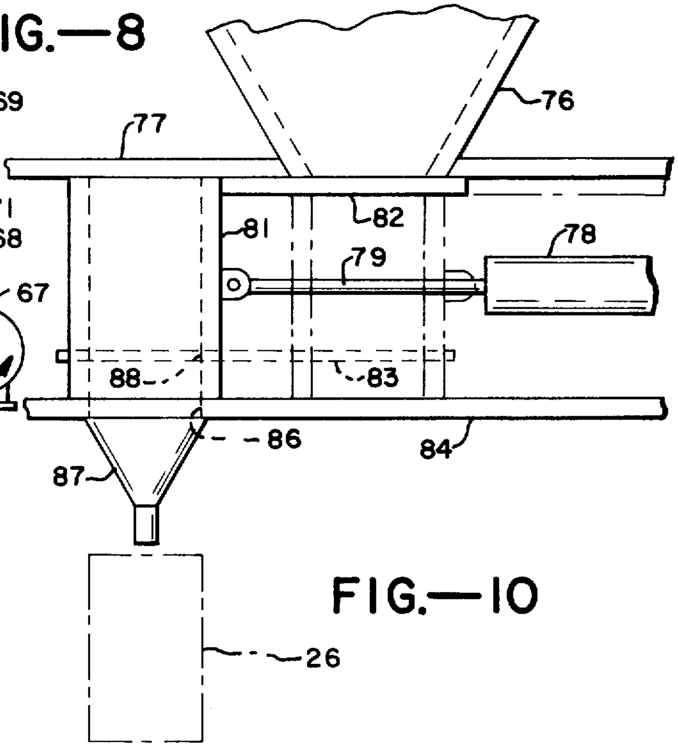
FIG. 10 is a side elevational view of one means for depositing powdered material in the lateral array of molds.
Figure 11:
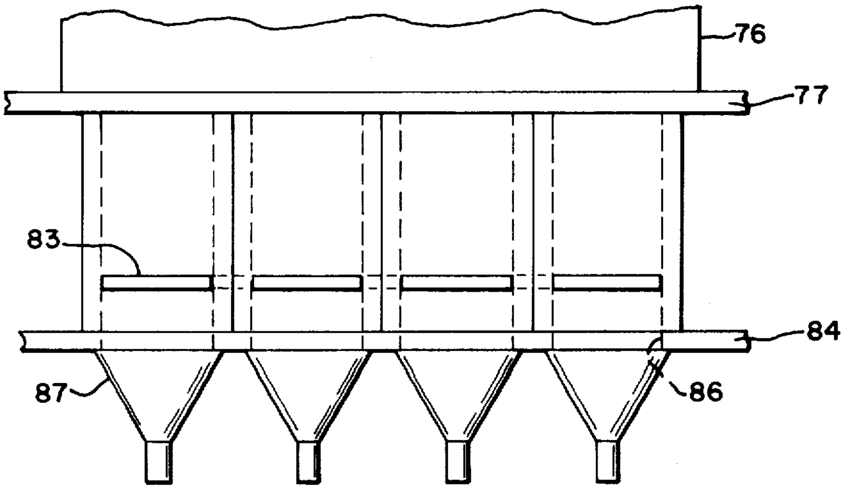
FIG. 11 is a front elevational view of the means of FIG. 10.

Means 37 may be configured in any one of a number of mechanical arrangements. One such arrangement is seen in FIGS. 10 and 11. A hopper 76 is filled with powdered wax and is supported by means including a plate 77. A cylinder 78 which may be pneumatic or hydraulic drives a piston arm 79 which is attached to a fill cartridge 81. A blocking plate 82 is attached to the top of fill cartridge 81 for sliding motion across the mouth of hopper 76. The height of fill cartridge 81, as seen in FIG. 10, determines a predetermined volume of powdered wax. When the entire height of fill cartridge 81 is used, round or pillar candles having, for example, a nine inch height may be fabricated. Fill cartridge 81 may be replaced by a shorter cartridge extending between a tray indicated by dashed line 83 to support plate 77. In such a case the predetermined volume in the shorter fill cartridge 81 may be sufficient for fabrication of six inch round or pillar type candles. A predetermined volume of powdered wax may be selected for any height candles by using a particular height fill cartridge 81 together with a tray such as seen at 83.

Fill cartridge 81 is guided on its lower end by a plate 84 and on its upper by the underside of support plate 77. When piston arm 79 is extended from cylinder 78, fill cartridge 81 is in the fill position. In the fill position, fill cartridge 81 overlies a hole 86 in guide plate 84 which is surrounded by a fill funnel 87 for directing powdered wax into the molds 26. As may be seen in FIG. 10 when piston arm 79 is drawn toward cylinder 78, fill cartridge 81 lies under the mouth of hopper 76 and is thereby filled with powdered wax. As fill cartridge 81 is moved to the fill position by an extension of piston arm 79, blocking plate 82 shuts off the flow of powdered wax from hopper 76 as fill cartridge 81 moves from beneath the mouth of the hopper. When fill cartridge is positioned above the fill position the powdered wax falls through hole 86, and is guided by funnel 87 into the shells formed in the molds 26. When a smaller volume of powdered wax is desired for shorter candles tray 83 is installed. A hole 88 is formed in tray 83, and tray 83 acts as a lower guide plate for fill cartridge 81 in place of plate 84. The remainder of the operation is as described above.

After the shells in molds 26 have been filled with powdered wax at the third station 36 the driving means advances conveyor belt 17 until the lateral array of molds reaches fourth station 38 where means 39 for sealing the powdered wax within the shell are positioned. Means 39 may be any one of a number of configurations including the array of heating elements 41 as shown in FIG. 3. An alternate method for sealing may include a means (not shown) for depositing a small amount of molten wax on top of the deposited powder. After a predetermined dwell time during which the seal has been applied at the fourth station 38, the drive means again advances conveyor belt 17 so that the molds with the seals applied may be cooled prior to removal from the belt 17. Cooling may be affected naturally or may be accelerated by cooling means 42 containing fans 43 for circulating cooling air about the sealed ends exposed in molds 26. Upon arrival of the lateral array of molds at the advanced end 21 of the upper forward segment 18 of conveyor belt 17, the lateral array of molds is detached from conveyor belt 17 by loosening wing bolts 47. As mold base plate 43 is withdrawn from conveyor belt 17 wicking 49 is unrolled from dowel 51 and clipped to release the lateral array of molds. Thereupon molds 26 are removed by lifting them off of mold sections 44 and the molded candles 11 are removed in finished condition for wrapping.

When a predetermined volume of liquid wax is selected for a specified size candle, a commensurate volume of powdered wax must be used to fill the shell after it is formed. Cooperating switches (not shown) may be actuated by the volume selections at the means 28 for depositing molten wax and the means 37 for depositing powdered wax. These switches may be arranged so that if the two volumes do not correspond, the drive means is de-energized. In this fashion too little or too much powdered wax will never be delivered at the third station 36. The system will automatically shut down until corresponding volume selections are made.

Figure 4:
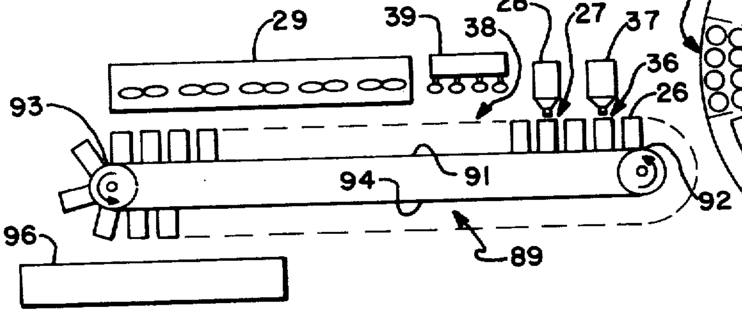
FIG. 4 is a mechanical schematic of another type of apparatus used in the disclosed process.

Another embodiment of the apparatus for fabricating molded articles is seen in FIG. 4. FIG. 4 has a conveyor belt 89 which is shorter than conveyor belt 17 of FIG. 3. Conveyor belt 89 also has an upper forward segment 91 with a starting end 92 and an advanced end 93. A lower return segment 94 extends from advanced end 93 to starting end 92. As described in FIG. 3 above, a means 28 for depositing molten wax is positioned at a first station 27 overlying conveyor belt 89 and followed by cooling means 29 toward the advanced end of upper forward segement 91. The lateral array of molds in the embodiment of FIG. 4 has means for attaching the molds to conveyor belt 89 so that molds 26 may be supported in an inverted position as they round the advanced end 93 of conveyor blet 89 onto the lower return segment 94 thereof. A wax shell is formed within molds 26 by the time they reach the advanced end 93 and the wax still liquid within molds 26 is poured out as molds 26 are inverted. The poured wax is caught in a tray 96 positioned below advanced end 93 and beneath lower return segment 94. Conveyor belt 89 is alternately advanced and brought to rest for predetermined periods of time as described for belt 17 of FIG. 3 above until molds 26 are once again brought to starting end 92.

Figure 5:
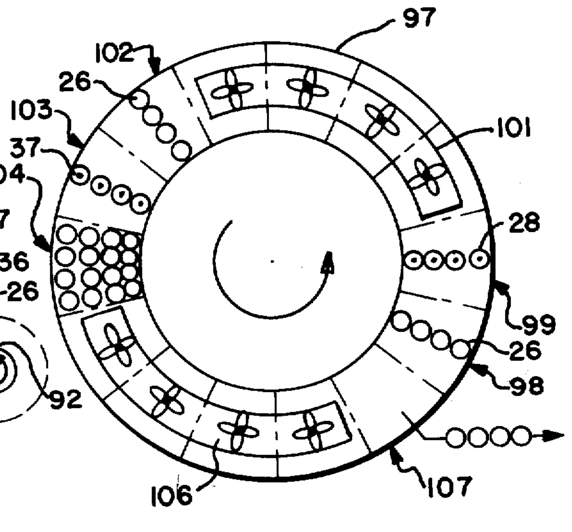
FIG. 5 is an additional type of apparatus used in the disclosed process.

Means 37 for depositing powdered wax in the shells in molds 26 is provided at third station 36 which is near starting end 92. After powdered wax is deposited in the shells as described above and conveyor belt 89 is advanced past third station 36, molds 26 are brought to fourth station 38 where they underlie means 39 for sealing as described in FIG. 3 above. Cooling means 29 toward the advanced end of conveyor belt 89 from fourth station 38 also serve the purpose of solidifying the seal as well as for forming the shell as previously described. The apparatus of FIG. 4 does not utilize means 33 for withdrawing molten wax, but substitutes an inversion and pouring out of the molten wax into the tray 96. The embodiment of FIG. 4 requires less space than that of FIG. 3.

Where a particular space requirement dictates, the embodiment of FIG. 5 may be used. FIG. 5 shows a rotating table or belt 97 having a starting position 98 showning a lateral array of molds 26 in position. The first station 99, similar to first station 27 in FIG. 3, has means 28 for depositing molten wax in molds 26. Molds 26 are passed beneath cooling means 101 similar to cooling means 29 in FIG. 3 for forming the shells within molds 26 to a second station 102 similar to second station 32 in FIG. 3 where means 33 are positioned for withdrawing molten wax from the molds 26. After a predetermined dwell time at second station 102 table 97 is advanced to a third station 103 similar to third station 36 in FIG. 3 where means 37 for depositing a predetermined volume of powdered wax are positioned above molds 26. Afer a predetermined dwell time period at third station 103 table 97 is advanced to a fourth station 104 similar to fourth station 38 in FIG. 3 above where means 39 are located overlying table 97 for sealing the powdered wax within each shell in molds 26. Subsequent to positioning in fourth station 104 table 97 is rotated to bring molds 26 underneath cooling means 106 for setting the seal applied at fourth station 104. Upon perfection of the seal by cooling means 106 molds 26 are positioned on table 97 at an end position 107 thereon. Molds 26 are removed from table 97 at position 107 and candles 11 are removed therefrom as described above.

The process described above for fabricating molded articles from a material assuming a solid phase at a lower temperature and a liquid phase at a higher temperature includes pouring the material in liquid phase in a mold and cooling the mold until a shell of the material solidifies at the surface of the mold. Thereafter removal of the remaining liquid phase material from the mold is performed. The material in powdered form is then placed in the shell in the mold to replace the volume of liquid phase material removed therefrom. A sealing operation is performed on the open end of the shell to contain the powdered material within the shell.

The above molded article may be a candle in which case the process includes extending a wick through the center of the mold prior to pouring the initial fill of liquid material. The process may also include dying the initial fill liquid phase material for providing a colored outer shell. The process may also include adding scent to the initial liquid phase fill for providing a scented outer shell.

As an example, molded wax three inch diameter candles have been fabricated using the aforementioned process. The apparatus envisioned for formation of such candles would have lateral arrays of molds 26 as shown in FIGS. 6 and 7 of the drawings. The lateral arrays of molds would be longitudinally spaced on conveyor belt 17 to include three arrays per foot, or twelve candles per foot. At a speed of one foot per minute average, the apparatus will produce a finished candle removed from the mold in approximately 60 feet or 60 minutes. The average speed is mentioned since the geneva drive for the conveyor belt 17, or some similar device, advances the belt four inches in approximately eight to ten seconds and then comes to rest for a predetermined dwell time of approximately ten to twelve seconds under the various stations described herein where fabricating functions are performed. It may be seen that a method and apparatus is disclosed herein which requires less handling on the part of a labor force, requires less time for a single article to be in a mold, requires less production space for a higher production rate, requires less raw materials for a number of finished articles, allows 100% usage of raw materials, requires less dye and scent for candles and provides a quality product in appearance and function.

The article and process described herein is not restricted to a candle and a process for fabricating candles. A molded article of any desired shape may be fabricated by the process. The molded article will have the advantage of light weight, reduction in amount of used raw material, reduction in cooling time for an article poured in the liquid phase and total use of all raw materials.

The material only need be capable of being melted to a liquid phase at a reasonable elevated temperature, and of being cooled to a solid phase at normal or room temperatures. The material should also be capable of being processed to assume a powdered form from the solid phase. In such an instance the molded article will include an outer shall of the material in a solid phase which is formed at the surface of a mold. One end of the shell is filled with the material in a powder form. The open end is sealed to retain the powder in the shell. A sealing pour of molten material may be used for the seal, or a plate may be placed in position overlying the open end and secured in place by some means for attaching the plate to the shell, such as an adhesive.

I claim:

1. A method of forming a wax pillar candle comprising the steps of securing a candle wick centrally disposed in a pillar candle mold, melting an amount of candle wax to assume a liquid phase, pouring a predetermined volume of the liquid phase wax into the mold, cooling the wax at the surface of the mold thereby forming a solidified shell in the mold having an open end, removing the remaining liquid phase wax from the mold, depositing a volume of wax in powdered form in the shell sufficient to substantially fill the solidified shell, forming a seal at the open end, on top of the powdered wax and about said wick, with liquid candle wax, said liquid wax being allowed to solidify to retain the powdered wax within the candle shell, releasing the wick from the mold, and removing the candle from the mold, whereby a wax pillar candle having the smooth exterior appearance of a solid molded candle is produced which assumes a flowering shell form as the candle burns.

2. A method as in claim 1 together with the step of dyeing the wax in the liquid phase thereby obtaining a colored solidified shell.

3. A method as in claim 1 together with the step of mixing a scent with the wax in the liquid phase thereby obtaining a scented candle.

4. A method as in claim 1 wherein the step of removing the remaining liquid phase wax comprises the step of inverting and draining the mold.

5. A method as in claim 1 wherein the step of removing the remaining liquid phase wax comprises the step of pumping the liquid phase wax from the solidified shell.

6. A method as in claim 1 wherein the step of forming a seal comprises the steps of heating the exposed portion of the wax in powdered form at the open end of the solidified shell above the melting point, and cooling the melted powder to a solidified state.

7. A method as in claim 1 wherein the step of forming a seal comprises the steps of pouring additional liquid candle wax on top of the wax in powdered form at the open end of the solidified shell, and cooling the additional wax to form a wall integral with the solidified shell.

* * * * *